(No Model.) 10 Sheets—Sheet 1.

J. F. GORDON.
GRAIN HARVESTING AND BINDING MACHINE.

No. 341,842. Patented May 11, 1886.

Witnesses:
Harry Shipley

Inventor:
James F. Gordon
By Phil T. Dodge.
Attorney (No Model.)

J. F. GORDON.

GRAIN HARVESTING AND BINDING MACHINE.

No. 341,842. Patented May 11, 1886.

Witnesses:
Harry Shipley
J. P. Hollingsworth

Inventor:
James F. Gordon
By Phil. T. Dodge, Atty.

(No Model.) 10 Sheets—Sheet 4.
J. F. GORDON.
GRAIN HARVESTING AND BINDING MACHINE.
No. 341,842. Patented May 11, 1886.

(No Model.)

J. F. GORDON.
GRAIN HARVESTING AND BINDING MACHINE.

No. 341,842. Patented May 11, 1886.

10 Sheets—Sheet 5.

Fig. 5

Witnesses:
Harry Shipley
[signature]

Inventor:
J. F. Gordon,
By P. T. Dodge
Attorney (No Model.) 10 Sheets—Sheet 6.
J. F. GORDON.
GRAIN HARVESTING AND BINDING MACHINE.
No. 341,842. Patented May 11, 1886.
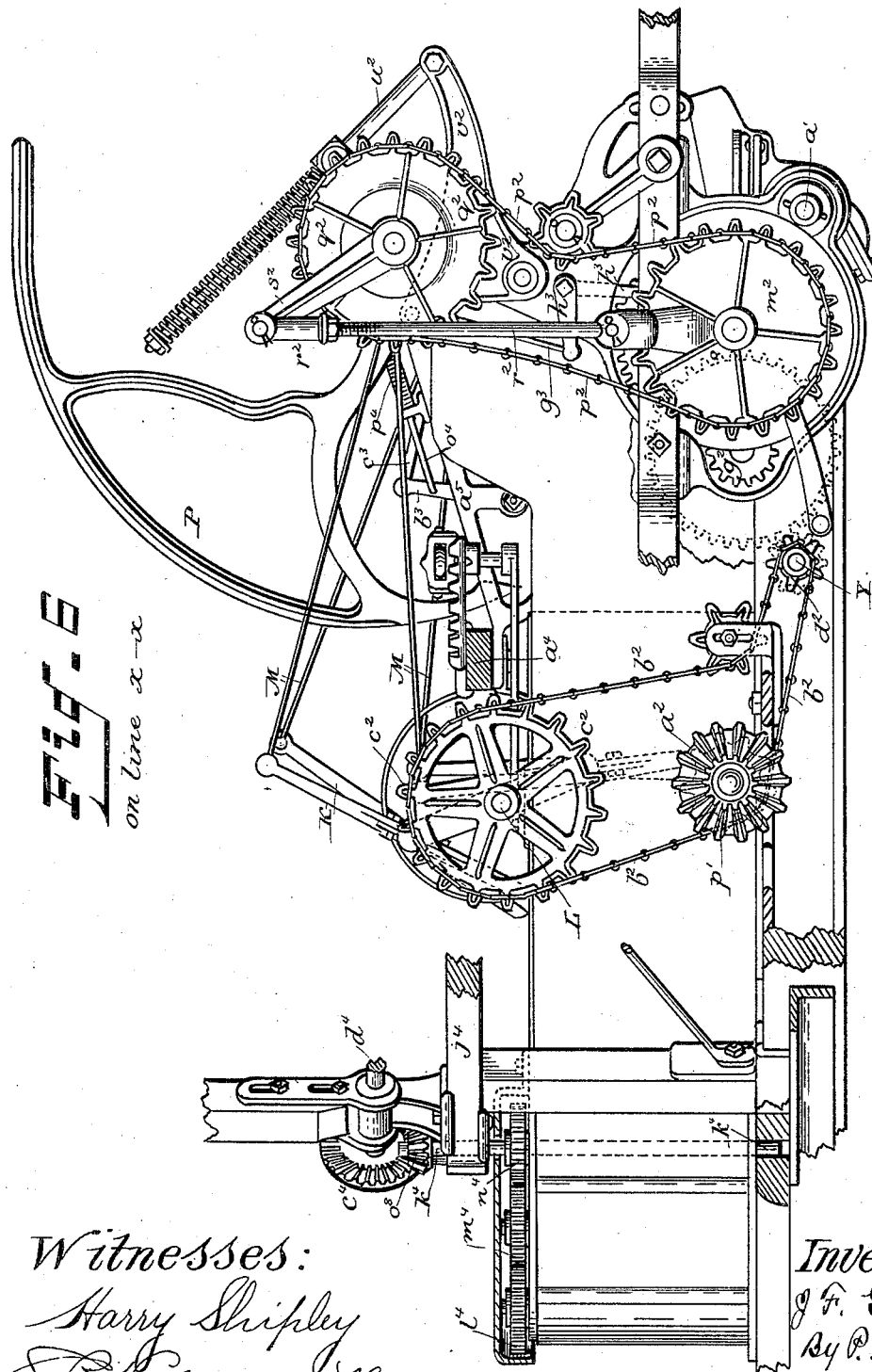

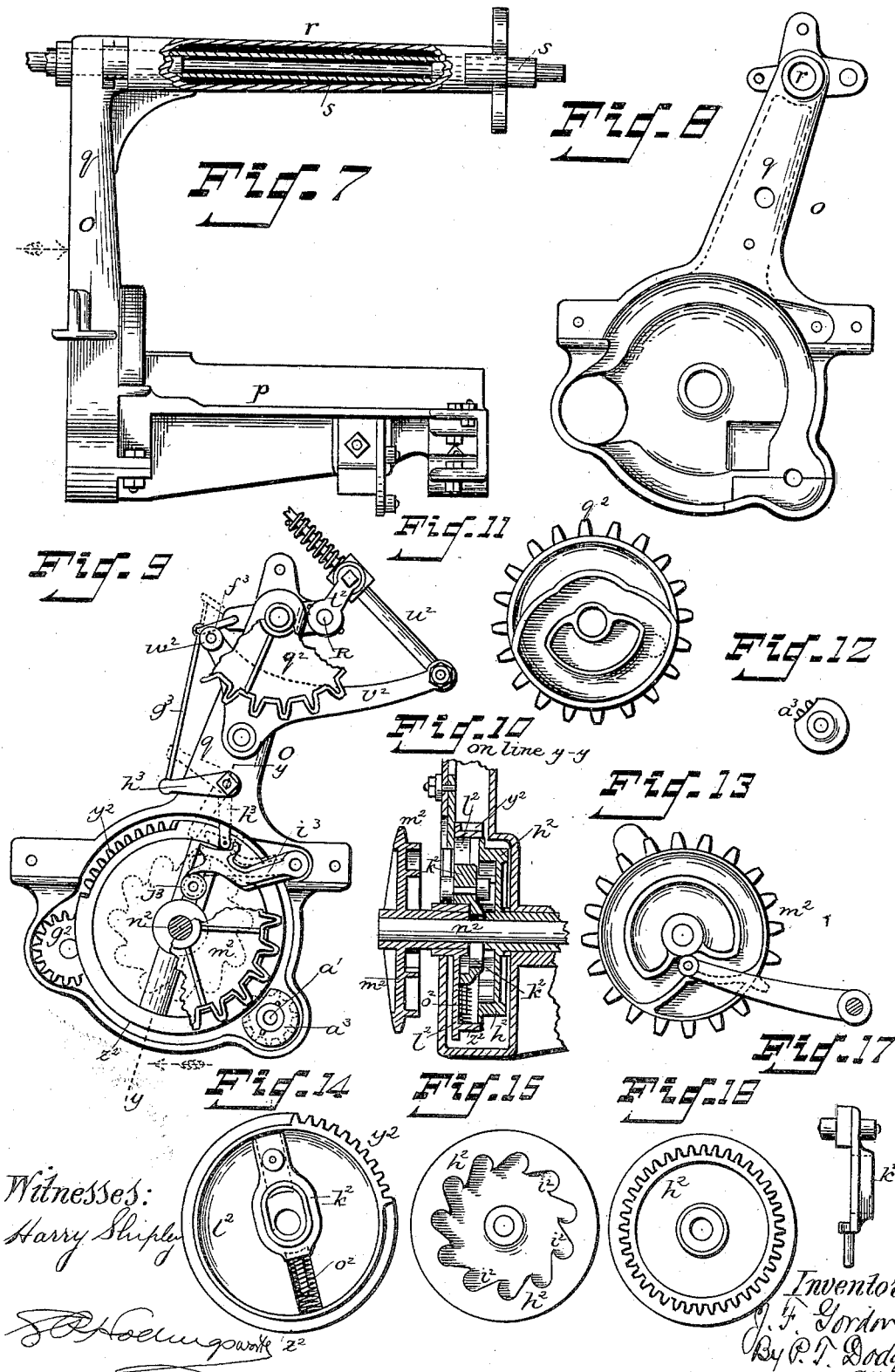

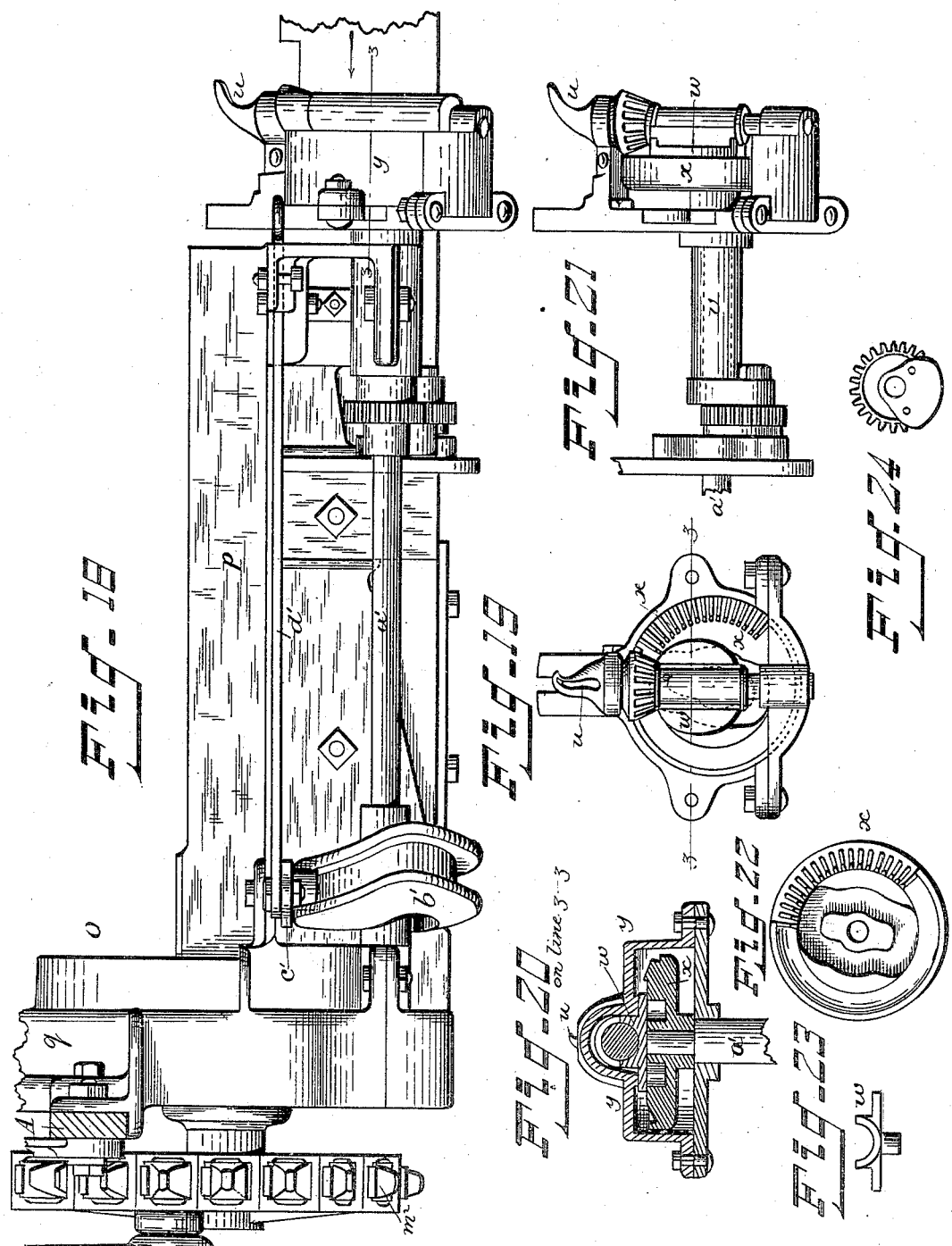

(No Model.) 10 Sheets—Sheet 9.
J. F. GORDON.
GRAIN HARVESTING AND BINDING MACHINE.
No. 341,842. Patented May 11, 1886.
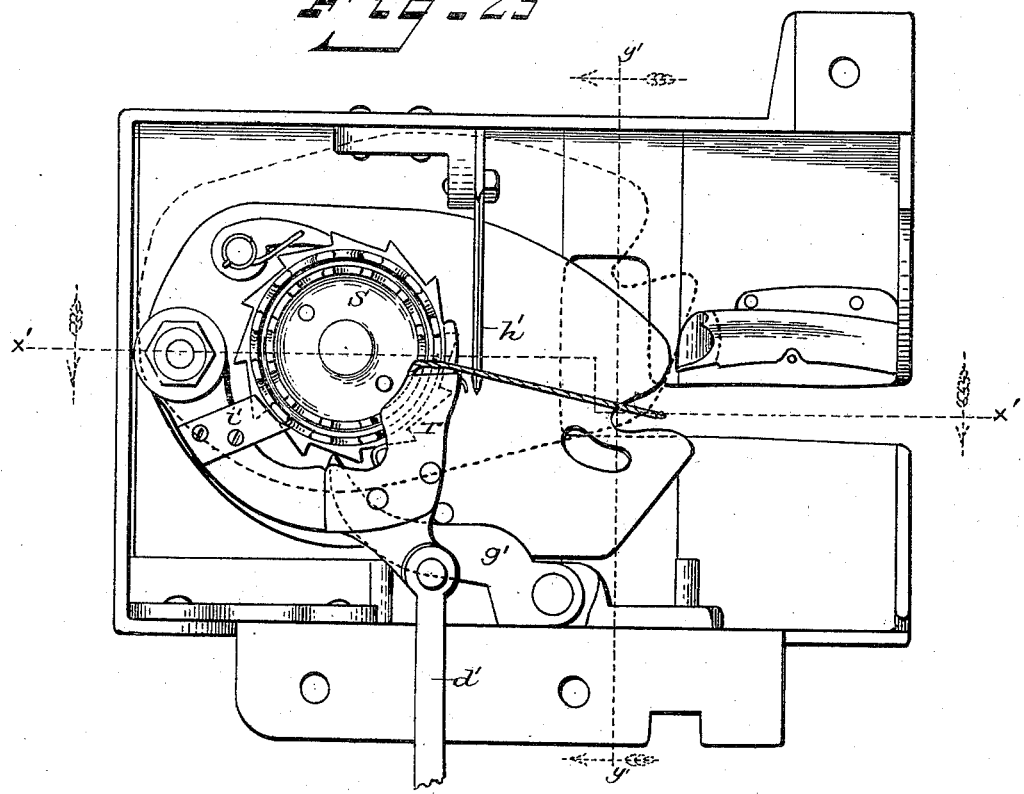
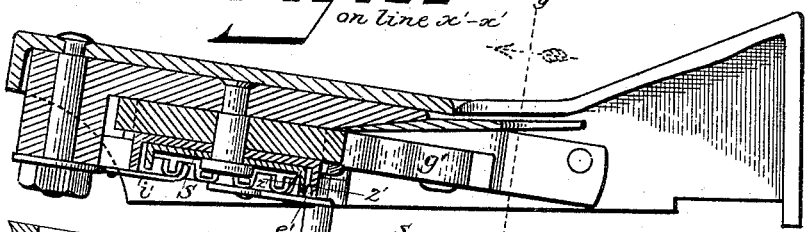
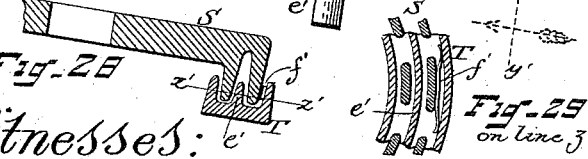
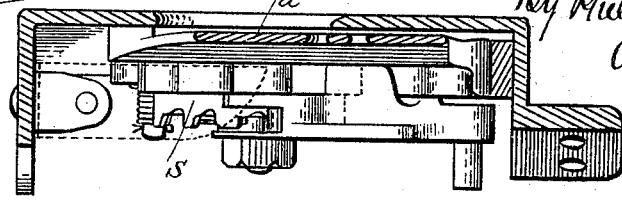
Witnesses:
Harry Shipley
Inventor:
J. F. Gordon
By Phil T. Dodge
Attorney

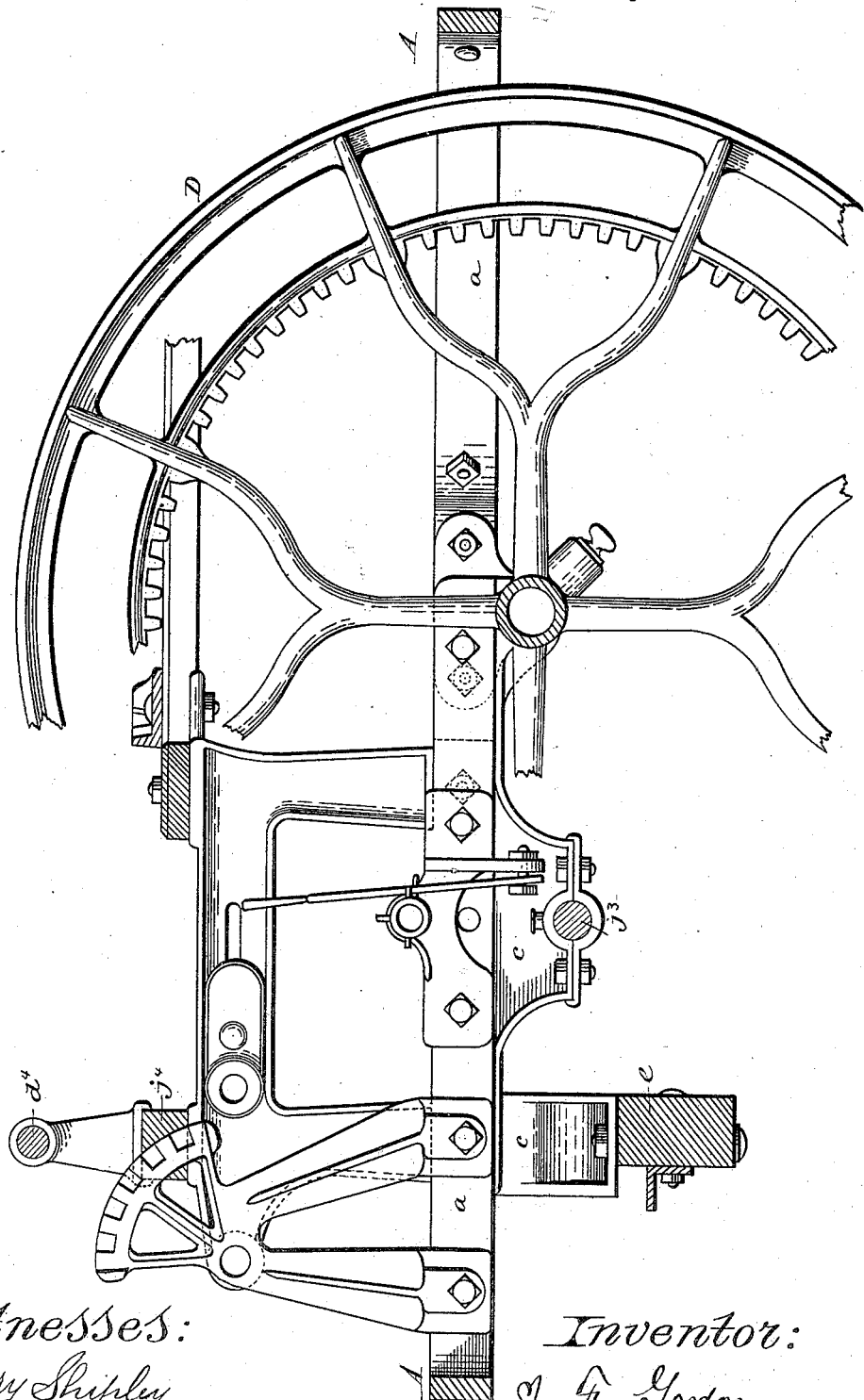

UNITED STATES PATENT OFFICE.

JAMES F. GORDON, OF ROCHESTER, NEW YORK.

GRAIN HARVESTING AND BINDING MACHINE.

SPECIFICATION forming part of Letters Patent No. 341,842, dated May 11, 1886.

Application filed December 30, 1884. Serial No. 151,584. (No model.)

*To all whom it may concern:*

Be it known that I, JAMES F. GORDON, of Rochester, in the county of Monroe and State of New York, have invented certain Improvements in Grain Harvesting and Binding Machines, of which the following is a specification.

The object of this invention is to provide a simple machine, light in weight and narrow in width, by which the grain shall be automatically cut, positively divided into gavels of suitable size, automatically bound into bundles, and delivered in rear of the main wheel. To this end it relates to a machine in which the platform-frame, connected to the binder-frame and provided with an oblique rear extension, is provided with platform-conveyers, which deliver the grain at the inner end of the platform in an oblique position, and with secondary conveyers, packers, and binding devices, all of which act in a direction oblique to the cutter-bar.

It also relates to the combination, with other parts, as hereinafter explained, of an oblique butting-apron, which serves to adjust the grain endwise with regard to the binder, and also to assist in imparting a rotation to the grain and to an abutment arranged obliquely on the platform-frame in position to arrest the grain and assist in the formation of the gavels.

It further relates to various improvements in the ejector, the tying mechanism, and other parts, as hereinafter recited in detail.

Figure 1:
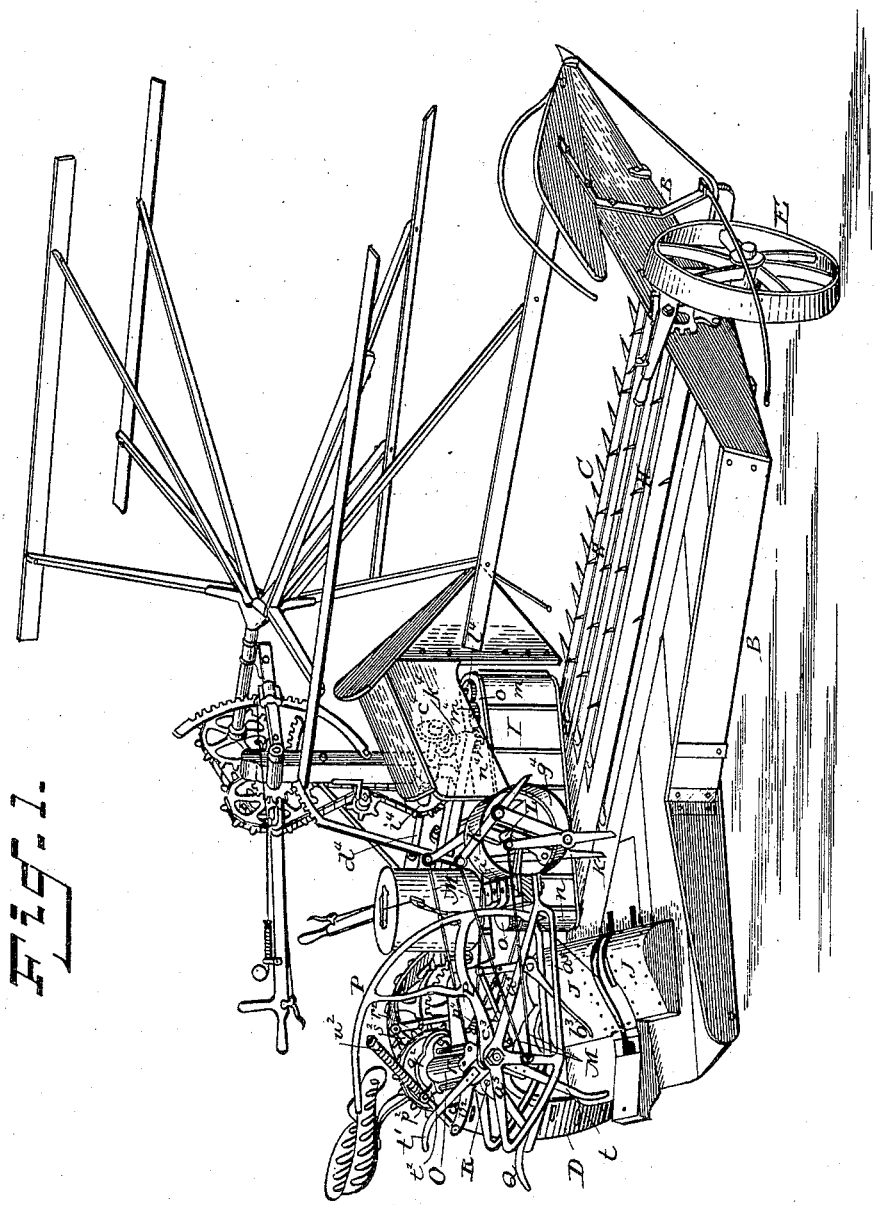
Figure 2:
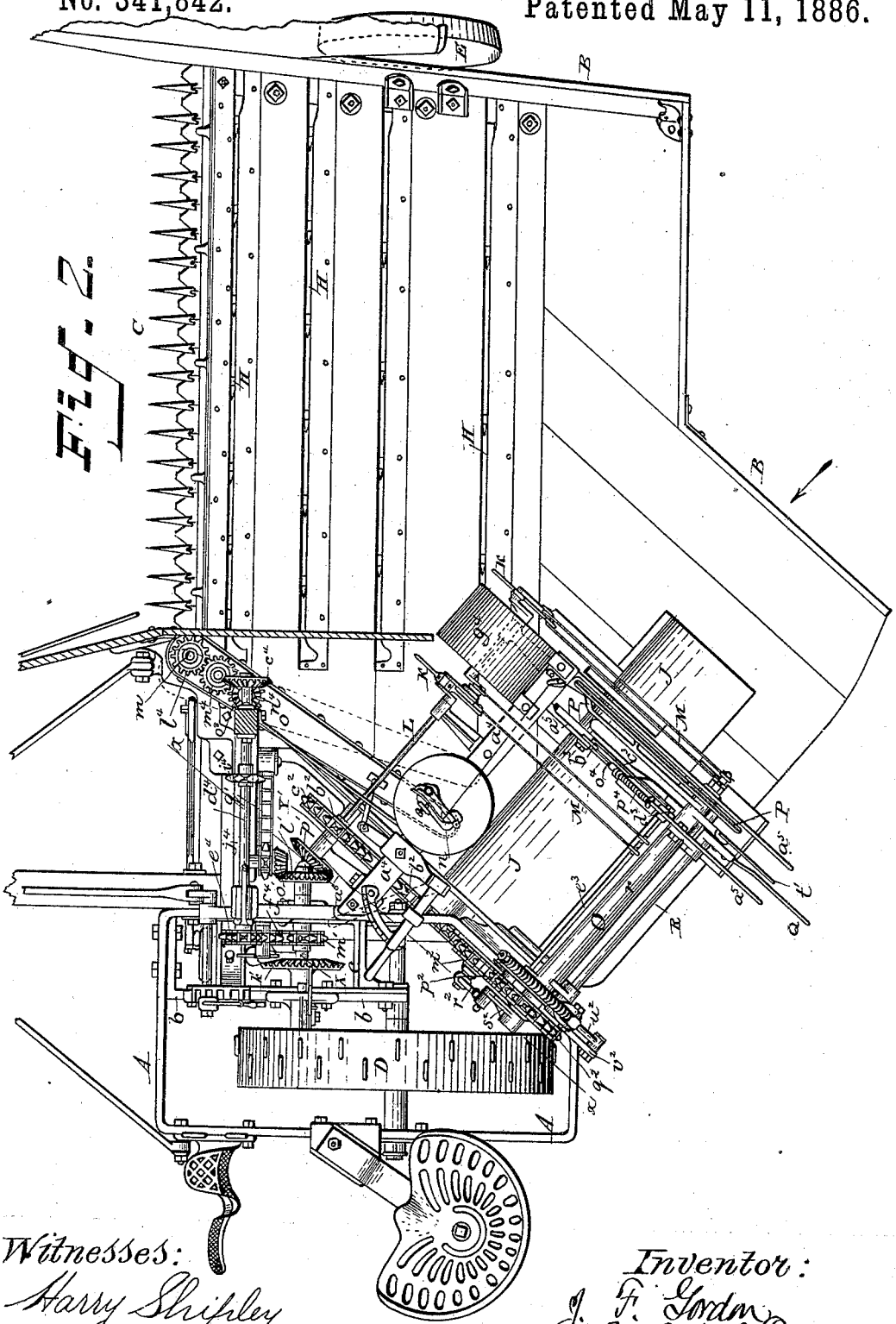
Figure 3:
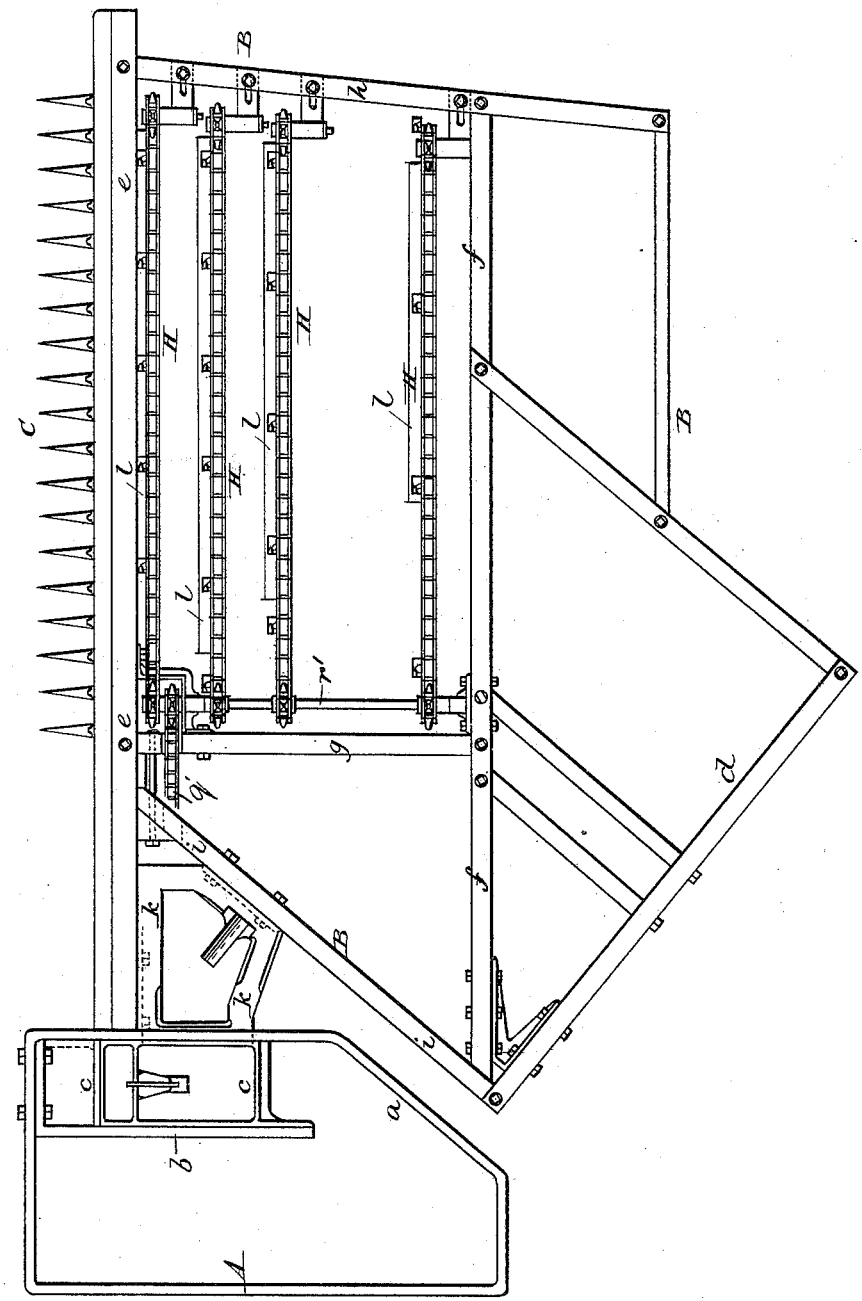
Figure 4:
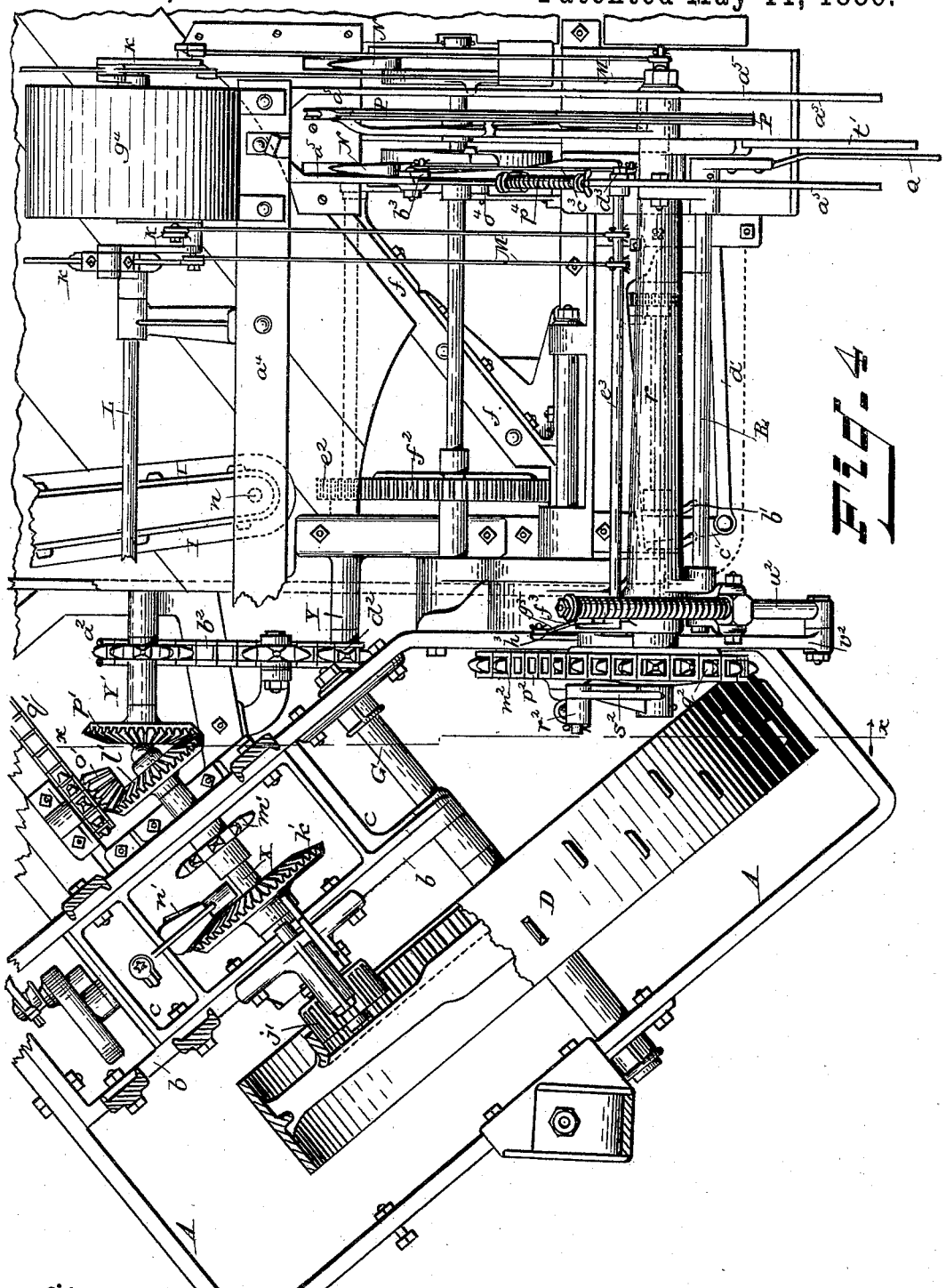

Figure 1 is a perspective view of my machine as seen from the rear grain-corner. Fig. 2 is a top plan view of the machine with the reel-standard and reel removed and the inner or main divider shown in horizontal section. Fig. 3 is a top plan view of the frame-work of the entire machine with the main conveyer-chains therein. Fig. 4 is a top plan view, on a larger scale, of the binding mechanism and those portions of the machine immediately adjacent thereto, the harvester-platform and the forward portion of the machine being removed in order to admit of the figure being made on a large scale. Fig. 5 is a rear elevation of the binding mechanism, the packer, and the grain-delivering devices, viewed in the direction indicated by the arrow in Fig. 2, the binding-table and packing devices being shown in vertical section. Fig. 6 is a sectional elevation of the binding mechanism and adjacent parts on the line $x\ x$, Fig. 4, looking in the direction indicated by the arrow. Fig. 7 is a side elevation of the binder-gear standard, its upper portion being represented in section to show the concentric shafts supported thereby. Fig. 8 is a front elevation of said standard. Fig. 9 is a front elevation of the standard with the driving-gear, trip devices, and various other parts applied thereto. Fig. 10 is a vertical section on the line $y\ y$ of the preceding figure. Fig. 11 is an inside face view of the wheel for operating the ejector-arm and compressor. Fig. 12 is an elevation of the stop-motion pinion, through which the knotter devices are operated. Fig. 13 is a side elevation of the wheel which serves to impart motion to the binder-arm and to control the action of the packing devices. Figs. 14 and 15 are inside face views of the two main parts of the clutch by which the binder is driven. Fig. 16 is an outside face view of the part represented in Fig. 15. Fig. 17 is an edge view of the intermediate member of the clutch. Fig. 18 is a rear elevation of the tying-bill and the devices for imparting motion thereto. Fig. 19 is an end elevation of the tying devices, viewed in the direction indicated by the arrow in Fig. 18. Fig. 20 is a cross-section on the line $z\ z$ of Figs. 18 and 19. Fig. 21 is a side elevation of the tying-bill and the parts immediately connected therewith, as they appear when removed from the bars or supports. Fig. 22 is a face view of the wheel by which motion is imparted to the tying-bill. Fig. 23 is an end view of the yoke by which the tying-bill is opened and closed. Fig. 24 is a view of the pinion and cam by which the rocking motion is imparted to the tyer. Fig. 25 is a bottom plan view of the cord clamping and cutting devices, the movable stripper-plate, and the attendant parts. Fig. 26 is a vertical cross-section on the line $x'\ x'$ of the preceding figure. Fig. 27 is a vertical cross-section on the line $y'\ y'$, Figs. 25 and 26. Fig. 28 is a cross-section through one edge of the cord-retaining wheel and the cam or shoe which operates to retain the cord therein. Fig. 29 is a cross-section on the line $z'\ z'$, Figs. 26 and 28, showing more particularly the cord-retaining spring used in connection with the cord-clamping wheel and its shoe. Fig. 30 is a front elevation, partly in section, showing the details of the main frame.

The frame-work of my machine consists, as particularly represented in Fig. 3, of a main or gear frame, A, and a platform-frame, B, rigidly united. The main frame A, designed to receive the main wheel and the principal parts of the driving-gear, is constructed of metal in the form of an oblong rectangle, except that its rear corner on the grain side is beveled or inclined at an angle of forty-five degrees (more or less) to the line of the cutter-bar, as shown at $a$. The formation of the frame with this beveled inner corner or side is a feature of great value in the present machine— first, in that it serves as a direct and rigid support for the binder-gear standard, and, second, because, as hereinafter explained, it permits the binding and conveying mechanisms to be brought nearer the main wheel than would otherwise be admissible, whereby the width of the machine is materially reduced. Within the frame A, which is preferably made of an endless bar of wrought-iron, I bolt firmly a horizontal bar, $b$, designed to co-operate with one side of the frame to support the internal cast-metal frame, $c$, which supports the various members of the gear-frame, as hereinafter described.

The platform-frame is made of flat form, its main or rectangular portion, on which the cut grain falls, being supplemented by a rearward extension, $d$, which extends backward toward the stubble side of the machine at an angle of forty-five degrees, or thereabout, for the purpose of giving support to the secondary platform or binding-table, on which the gavels are accumulated and bound. The details of the frame-work may be modified as desired, provided it is adapted to give support to the parts hereinafter described; but I recommend the particular construction shown in Fig. 3. In this figure the front sill, $e$, supporting the finger-bar C, of ordinary construction, and the rear sill, $f$, are connected by cross-timbers $g$ and $h$. The rear sill, $f$, is extended beyond the platform proper toward the main frame, and secured to one end of a timber, $i$, which is extended forward and bolted to the front sill near the inner or heel end of the finger-bar. The front sill is bolted firmly to an arm extending downward from the internal portion, $c$, of the main frame, as represented in Fig. 30.

The main and platform frames are further united by means of an intermediate angular frame, $k$, bolted to and between them, as shown in Fig. 3. They are also further connected at the rear by means of the binder-gear standard, in the manner hereinafter explained, the effect of the various connections being to unite the main and platform frames rigidly to each other.

To support and carry the machine, I make use of the main ground-wheel D, located in the main frame, and the small ground-wheel E, commonly known as the "grain-wheel," located at the grain side of the platform-frame, these two wheels being arranged with their axes in line, or substantially so, in order to admit of the machine rocking or tipping forward and backward to vary the height of the cut, and to admit of the parts being properly poised or balanced that the adjustment may be readily made, and to relieve the draft-animals from undue labor. The grain-wheel may be attached in any ordinary manner.

The main wheel D is arranged to turn loosely on an axle, G, sustained in bearing-plates bolted to the main frame. It is constructed with an internal gear, and arranged to transmit motion through a system of gearing, hereinafter described, to the various operative parts of the machine. The platform-frame will be provided with a deck or covering to receive and support the grain, as usual.

For the purpose of delivering the grain which falls from the cutters upon the main platform at the inner end of the latter in a position oblique to the line of cut, I mount in the platform-frame a series of horizontal endless conveyer-chains, H. These chains travel parallel with each other and lengthwise of the platform, and are each provided with a series of angular teeth pivoted thereto and arranged to co-operate with stationary tracks or guides $l$, whereby they are caused to rise through slots in the platform, and carry the grain before them while moving toward the stubble side of the machine, but permitted to fold downward to an inoperative position during their return movement. These chains being of ordinary construction and familiar to those skilled in the art, it is unnecessary to describe them more in detail. The tracks $l$ terminate at different distances from the stubble side of the machine, being made successively shorter from the front of the machine toward the rear. This arrangement causes the forward chains to act upon the grain for a longer time and to move the same inward a greater distance than the chains in rear thereof, the effect of which is to give the grain a turning motion as it is delivered at the inner end of the platform, so that the grain will be delivered by the conveyers H in a position oblique to the line of the cutter-bar, the butts in advance of the heads.

The construction of the conveyers as above described is identical with that represented in applications for Letters Patent filed by me on the 28th day of May, 1883, and the 6th day of February, 1884, No. 320,348, patented June 16, 1885, and is not separately claimed as a feature of the present invention. Between the inner end of the platform proper and the main frame—that is to say, beyond the heel end of the cutter-bar—I locate an endless butting-apron, I, supported at one end by a vertical roller, $m$, at the inner or heel end of the cutter-bar, and extended thence backward in an oblique direction to a second supporting-roller, $n$, located in the rear end of a supporting-frame, $o$. The apron is provided with cleats or cross-bars on its vertical surface, and is driven continuously, whereby it is caused to act on the butts of the grain and move the latter endwise in a backward direction.

As shown in Figs. 1, 2, and 6, the butting-apron receives motion through its forward carrying-roll, which is in turn driven by intermediate pinions, hereinafter described, from a vertical beveled pinion, $c^4$, on one end of a horizontal shaft, $d^4$, which, as shown in Fig. 2, has its opposite end provided with and driven by a sprocket-wheel, $e^4$. The last-named wheel receives motion through a chain, $f^4$, from a sprocket-wheel, $m'$, hereinafter referred to as being driven by direct connection with the main wheel. It will be observed that the shaft $d^4$ carries a sprocket-wheel, $i^4$, which transmits motion through intermediate gearing to the reel, the one shaft thus serving to drive both the reel and the butting-apron. This shaft $d^4$ is sustained in boxes or bearings bolted to a timber, $j^4$, lying above and parallel with the finger-bar, with one end bolted to the casting rising from the harvester-frame, and the opposite end secured to the top of a post rising rigidly from the heel end of the front sill or the finger-bar, as in Fig. 6. This timber serves as the bearing for the upper end of the vertical shaft $k^4$, around which the frame of the butting-apron swings, as plainly represented in Figs. 1, 2 and 6.

Butting-aprons usually have their frames arranged to swing around the journals of the roll which carries the forward end of the apron. I depart from this construction, as shown in Figs. 1, 2, and 6, by locating the shaft or journal $k^4$ in rear of the forward roll, or, in other words, by extending the frame and apron in advance of the pivotal shaft $k^4$ and in front of the cutter-bar, so that the apron will engage the butts of the fallen grain, which frequently lie ahead of the cutter, so as to carry them backward speedily and with certainty.

As shown in Fig. 6, motion is imparted to the forward roll through a pinion, $l^4$, on its upper journal, driven by an idle-pinion, $m^4$, from a pinion, $n^4$, mounted on the pivot-shaft $k^4$. This shaft receives motion through a beveled pinion, $o^3$, from the pinion $c^4$, before referred to, on the end of the reel-driving shaft $d^4$. This arrangement is adopted because bearings or supports cannot be conveniently applied to sustain the roll-frame at its forward end when it is extended ahead of the cutter.

It is manifest that the intermediate pinion, $m^4$, may be omitted and the wheels $l^4$ and $n^4$ connected by means of the belt or chain.

On the binding-table or rear extension of the platform there is an elevated abutment or housing, J, the front face of which stands in a position oblique to the line of the cutter-bar, and approximately parallel to the grain as the latter is delivered from the platform-conveyer. The forward side of this housing serves as an abutment to arrest the heads of the grain while the butts are being urged backward by the apron I, so that by the joint action of the housing and the apron the grain is given a still further rotation in a horizontal direction, and the stalks laid parallel with each other and with the face of the abutment J. By swinging the apron-frame about its axis the angle of the apron with respect to the cutter-bar may be varied so as to urge the grain endwise to a greater or less extent during its backward movement, and in this way the grain may be adjusted, whether long or short, to receive the binding material at its middle.

For the purpose of receiving the grain from the platform-chains and urging the same backward toward the housing J in a direction oblique to the cutter, I employ a secondary conveying mechanism, which may be of any appropriate form, but which consists in the present instance of picker-fingers K, carried by cranks on a horizontal shaft, L, and pivoted at their upper ends to horizontal controlling-rods M, which are extended to suitable supports at the rear of the machine. The rotation of the crank-shafts L causes the points of the fingers to travel in a circulatory course, each finger rising and moving forward above the grain, and then descending therein and moving backward, so as to urge the grain toward the abutment. These secondary pickers, which are distinct from the packing devices and from the main or platform conveyers, will, it is found in practice, receive the grain in the oblique position in which it is delivered by the platform-conveyers, complete its turning motion, and carry it backward against the abutment without the assistance of the butting-apron I, which is employed mainly for the purpose of effecting the endwise adjustment. It is to be noted that the secondary conveyers or "pickers" K operate in vertical planes oblique to the line of the cutter-bar, and at right angles, or substantially so, with the front face of the abutment J.

The crank-shaft L of the secondary conveyer is mounted in bearing-plates bolted to and sustained by a horizontal timber, $a^4$, one end of which is bolted firmly to the casting $a^6$, rising from the harvester-frame, while its opposite end is sustained by the arms or plates $a^5$, which are bolted firmly to the extreme overhanging end of the binder frame or standard, and which overlie the grain-passage and binding-table, as in my Patent No. 320,348, dated June 16, 1885, to assist in confining the gavel. This mode of sustaining the timber which lies oblique to the cutter-bar insures a rigid support of the secondary conveyers. This horizontal timber also sustains a cylindrical metal guard or shield, $g^4$, which encircles the crank-shaft of the seconary conveyers, as shown in Figs 1, 2, 4, 5, and 6, in order to prevent the grain from becoming entangled in the moving parts and being wound upon the shaft. This guard, which may be modified in form and construction, provided it encircles the shaft, is an important feature of the invention.

While I prefer to make use of the main and secondary conveyers in the form herein shown, it is to be understood that the main conveyers may be replaced by toothed reciprocating bars or other known forms of conveyer adapted to deliver the grain in the manner described, and that the secondary conveyer may be replaced by toothed disks or equivalent devices known in the art, adapted to deliver the grain backward in an oblique direction to the abutment and packing devices.

For the purpose of receiving the grain from the secondary conveyers K and delivering the same forcibly to the binding devices with a continuous action, I employ suitable packing devices, N. I prefer to use for the purpose a rotary toothed packer—such as represented in Fig. 5—consisting of a series of fingers pivoted to continuously-rotating disks and controlled by adjustable cams, whereby they may be projected through slots in the abutment J to engage the grain, or permitted to revolve idly within the casing during the time that a previously-accumulated gavel is being bound. These packing devices are identical in construction and operation with those described in my application for Letters Patent filed on the 6th day of February, 1884, No. 119,985, to which reference may be made for a detailed description thereof, as they are not separately claimed as a part of the present invention.

The grain is received from the packing devices encircled with cord or other binding material, and delivered from the rear end of the machine by binding devices, which I will now describe. The mechanism is of that type in which a vertically-vibrating arm located above the grain throat or passage delivers the binding-cord to a tying device located beneath the binding-table, and in which the compressive action of the binding arm or needle upon the gavel is resisted by an adjustable compressing-arm, which rises in a rearward direction to permit the escape of the bound bundle, the general construction and arrangement being similar to that represented in my two applications hereinbefore referred to.

To support the principal parts of the binding mechanism I provide a binder-frame or gear-standard, O, such as represented in Figs. 7 and 8, consisting of a horizontal base portion, $p$, to sustain the tying devices and attendant mechanisms, a standard, $q$, at one end of the same, and a horizontal arm, $r$, overhanging the base portion and designed to sustain the shaft which carries the binder-arm, the ejector, and the compressor, together with other parts. In its general form this binder-frame resembles those in common use in the Appleby type of binder; but it differs therefrom in various details, which will be presently explained, and particularly in having one end of the base portion and standard enlarged and recessed or chambered, as shown, to receive the driving-gear. The base portion of the binder-arm is suitably flanged to admit of its being bolted on one side to the main frame A and on the opposite side to the platform-frame, as represented in the various figures. In this manner the several frames are tied securely together and the standard of the binder-frame maintained firmly in position, its overhanging arm extending from a point near the main wheel obliquely and rearwardly toward the grain side of the machine, as plainly represented in Figs. 1, 2, and 4. In the overhanging arm $r$ of the binder-frame I mount a tubular shaft, $s$, to one end of which there is secured the ejector, having, as shown in Fig. 5, two arms, $t$ and $t'$, fixed at an angle of about one hundred and twenty degrees to each other. The arm $t$ is designed to remain in position to sustain the accumulating gavel, as shown in Fig. 5, during the time that the compressor proper is elevated to permit the discharge of the bound bundle, while the arm $t'$ is designed to effect the discharge of the bundle. The ejector-shaft receives an intermitting rotary motion, making at each movement a complete revolution, so that as the arm $t$ is carried upward from the rear side of the bound bundle the arm $t'$ acts against the opposite side of the bundle to effect its delivery. The rotation of the arm occurs while the binder-arm is in its depressed position, and while the inflow of grain is prevented, so that the movement of the arms is not impeded by the grain.

The binder-arm or needle P, which vibrates in a vertical plane oblique to the cutter-bar, has a concave inner side to embrace the gavel, and an outer edge or guard concentric with the shaft, or substantially so, to hold back the loose grain during the time that the needle is depressed. In form and action the needle is essentially the same as that described in my applications previously referred to, and in common use in the Appleby machines. After the accumulation of a gavel of appropriate size the needle descends, carrying the cord about the same to the tying devices, and at the same time effecting the necessary compression. The compressive action of the needle is opposed by the compressing-arm Q, depending from a rock-shaft, R, mounted in ears on the overhanging arm of the binder-frame. During the accumulation of the gavel the compressor Q stands in the elevated position represented in Fig. 5. When the gavel has acquired a suitable size, the needle and the compressor descend simultaneously on opposite sides, compressing the gavel between them, and remaining in position until the completion of the tying operation, after which they rise to their original positions, the elevation of the compressor permitting the ejector to deliver the bundle.

The tying mechanism is constructed and arranged to operate in substantially the same manner as that represented in my application No. 119,985, before referred to. The tying or knotting device proper, $u$, is of the form commonly known as a "tying-bill," and has its spindle mounted in bearings formed on the end of a horizontal rock-shaft, $v$, which turns in bearings on the binder-frame, so that the tying-bill may be vibrated lengthwise of the cord during the tying operation, as in my original machine. The movable jaw of the tyer is connected with a rod located centrally in the spindle, and operated by a projecting pin which engages a slide or yoke, $w$. This yoke is grooved on one side to fit closely against the spindle, and is provided on the opposite side with a stud, through which it receives motion from a cam-groove on a wheel, $x$, the cam moving the yoke lengthwise of the spindle, and thereby opening and closing the tyer.

One feature of the present invention consists in a cap or covering-plate, $y$, which is formed and applied, as shown in Fig. 20, to inclose the spindle, the yoke, and the wheel $x$. The sides of this cap are flanged and bolted to the end of the rock-shaft in which the spindle-bearings are formed, as plainly represented in Figs. 18 and 20. The cap is also provided on the inside with shoulders, which serve as guides for the sliding yoke $w$. The use of the cap is advantageous in that the operative parts of the tying mechanism are protected from the entrance of dust, straw, and other foreign matters, which are peculiarly liable to interfere with the tyer, owing to the fact that it is carried close to the surface of the ground. The tyer-spindle receives motion through a pinion thereon from teeth formed on the periphery of the wheel $x$. These teeth encircle but a portion of the periphery of the wheel, the remaining portion of which has a smooth or delay surface to co-operate with a corresponding surface on the tyer-pinion, the two constituting an ordinary stop-motion gear, by which the continuous rotation of the driving-wheel is caused to impart an intermitting rotation to the tyer. The shaft $a'$, which carries the wheel $x$, is extended through the tubular rock-shaft $v$, and provided near one end with a wheel, $b'$, having a peripheral cam-groove, as shown in Fig. 18. This cam-groove engages a roller on a vibrating arm, $c'$, one end of which is pivoted to the binder-frame, while the opposite end is attached to a reciprocating bar, $d'$, by which the vibrating stripper-plate is actuated, as shown in Fig. 25. This cam applied to the tyer-driving shaft constitutes another feature of the present invention, and forms a more simple arrangement for operating the stripper-plate than that presented in my previous application. The stripper-plate, which vibrates between the tying-bill and the stationary throat-plate and its adjuncts, being substantially identical with that represented in application No. 119,985, need not be described in detail herein.

I employ, as in the preceding application, a cord-clamping crown-wheel, S, pivoted to and vibrating with the stripper-plate. This wheel, however, instead of being constructed with a single annular flange, as in the former machine, is now constructed with two annular flanges separated by an intervening groove or channel. The shoe or clamp T, which co-operates with the wheel to hold the cord in engagement therewith, is now constructed to fit upward over the two flanges, and also provided with a central lip or rib, $e'$, to enter between the flanges, as represented in Figs. 28 and 29. The effect of this central lip is to bend the cord upward between the flanges, and thus insure its being held with firmness otherwise unattainable.

As an additional means of securing the cord, I propose to apply within the shoe a flat spring or plate, $f'$, to bear against the outer surface of the outer flange of the wheel, as represented in Figs. 28 and 29. This spring, acting upon the cord, will hold the same firmly in contact with the flange, and will at the same time yield and adapt itself to inequalities or irregularities in the size of the cord. The wheel is turned by means of a pawl or dog, $g'$, and the cord severed by means of a stationary knife, $h'$, as in the former machine. The binder-arm, when descending, passes the cord around the bundle, through the slots in the stationary throat-plate and in the edge of the stripper-plate, and finally into the notches in one edge of the clamping-wheel. The rotation of the wheel causes the cord to be carried at the proper time beneath the shoe or clamp T. The vibration of the stripper-plate with the clamping devices thereon causes the cord to be presented at the proper time to the stationary knife. With this action the present invention has nothing to do.

For the purpose of removing the small end portions or fragments of the cord from the clamping-wheel, I propose to use a stripper-plate, $i'$, the beveled end of which lies in close proximity to the outer flange of the wheel, as seen in Fig. 25. This stripper-plate is one of the features of the present invention.

Passing now to the gearing by which motion is transmitted to the various parts of the machine, attention is directed to Figs. 1, 2, 4, 5, 6, 9, and 10. The main wheel D is provided on one side with an internally-geared ring, which imparts motion to the pinion $j'$, the shaft X of which is seated in bearings in the main frame and provided with two beveled wheels, $k'$ and $l'$, and also with a sprocket-wheel, $m'$. The wheel $k'$ drives a pinion, $n'$, the shaft of which is provided with a crank-wheel for driving the cutter-bar. The wheel $l'$ engages a pinion, $o'$, and also a beveled gear-wheel, $p'$. The pinion $o'$ is formed in one piece with or attached to a sprocket-wheel, from which a driving-chain, $q'$, is extended, as in Figs. 3 and 4, to a wheel on a shaft, $r'$, which carries the pulleys for driving all the main conveyer-chains H. The gear-wheel $p'$ is applied to a short shaft seated obliquely in the main frame and provided with a sprocket-wheel, $a^2$, from which a chain, $b^2$, is extended, as shown in Fig. 6, to a sprocket-wheel, $c^2$, on the crank-shaft of the secondary conveyers, and also to a sprocket-wheel, $d^2$, on a short shaft, Y, seated in the frame, and provided at its opposite end, as seen in Fig. 4, with a pinion, $e^2$, which engages directly with a gear, $f^2$, on the packer-shaft.

It will be seen that under the above arrangement the chain $b^2$ is driven continuously, and imparts a continuous motion to the secondary conveying-fingers K and to the rotary packers. It will be observed that the end of the shaft Y' is made of spherical form and seated in a corresponding cavity in the end of the shaft X, this arrangement constituting a universal joint between the shafts, and enabling the shaft X to support the overhanging end of the shaft Y'.

For imparting motion to the binder-arm, compressor, &c., the continuously-driven packer-shaft is provided with a pinion, $g^2$, which engages with and imparts motion to the wheel $h^2$, as represented in Figs. 9, 10, 15, and 16. This wheel $h^2$, which constitutes one part of the binder-driving clutch, has a tubular journal, and revolves loosely in a bearing in the base of the binder-frame, as plainly shown in Fig. 10. On its inner side it is provided, as in Figs. 10 and 15, with an internally-toothed rim, to engage with a roller or stud, $n$, on a driving-dog, $k^2$, attached to a wheel, $l^2$. The wheel $l^2$, which forms the second part of the clutch, is keyed fast or otherwise connected to an outside sprocket-wheel, $m^2$, both wheels being mounted on a horizontal shaft, $n^2$, which revolves loosely in a bearing in the frame and in the hub of the wheel $h^2$. The intermediate dog or yoke, $k^2$, is movable in a radial direction in a seat in the wheel $l^2$, and is urged endwise, as seen in Figs. 10 and 14, by a spring, $o^2$, the tendency of this spring being to engage the stud of the dog in the teeth of the wheel $h^2$, so as to lock the two wheels together and compel them to revolve in unison. When, however, the dog is urged inward, it disengages from the wheel $h^2$, permitting the latter to continue its rotation, while the other parts remain at rest. The mode of effecting this disengagement will be presently described. The wheel $m^2$ is connected, as shown in Fig. 6, by a chain, $p^2$, to a wheel, $q^2$, secured on the tubular shaft which carries the ejector-arm, a rotary motion being in this manner imparted to the ejector whenever the clutch is engaged. The wheel $m^2$ is also provided with a crank-arm or wrist, connected, as seen in Fig. 6, by a pitman, $r^2$, to a crank-arm, $s^2$, on the binder-arm shaft, the relative throw of the two cranks being such that the rotation of the wheel $m^2$ will impart a vibratory motion to the arm $s^2$ and the binder-arm.

The rock-shaft carrying the compressor Q is provided, as shown in Fig. 9, with a crank-arm, $t^2$, connected by a rod, $u^2$, to a lever, $v^2$, which is pivoted to the binder-standard and provided with a roller, $w^2$, entering a cam-groove in the face of the ejector-driving wheel $q^2$, this arrangement being the same as in my previous machine. The driven wheel $l^2$ of the clutch has, as shown in Figs. 9, 10, and 14, spur-teeth $y^2$, encircling a portion of its periphery, and a delay-surface, $z^2$, encircling the remainder. The teeth and the delay-surface act in connection with the pinion $a^3$, secured to the end of the tyer-driving shaft $a'$, this pinion being also provided with a delay-surface to co-operate with that on the driving-wheel. Owing to the above construction, the wheel $l^2$, during a portion of its revolution, imparts motion to the pinion $a^3$ and to the tyer, and during the remainder of its revolution holds said parts at rest. The parts are of course properly timed to cause the action of the tyer during the depression of the needle or binder-arm.

For the purpose of securing an automatic action of the machine, I employ a trip mechanism actuated by the accumulating gavel to throw the binding mechanism into action whenever the gavel reaches a predetermined size. This mechanism is plainly represented in Figs. 1, 5, 6, 9, and 10. The trip-arm $b^3$ overlies the grain-passage and binding-table. It is pivoted midway of its length to the frame, and connected at its opposite end by a rod, $c^3$, to a crank-arm, $d^3$, on one end of a horizontal rock-shaft, $e^3$. This shaft is mounted in bearings in the frame, and provided at its opposite end with a second crank, $f^3$, connected by a rod, $g^3$, to an angular lever or finger, $h^3$, the lower end of which is usually provided with an anti-friction roller, as in Fig. 9. To the binder-frame there is pivoted a gravitating pawl or dog, $i^3$, the upper surface of which is in position to be acted upon by the depressing-finger $h^3$, while its lower surface is in position to act upon a roller, $j^3$, projecting outward from the clutching-dog $k^2$. Whenever the grain acts to lift the trip-arm, it has the effect, through the intermediate parts, of throwing the finger $h^3$ out of engagement with the dog $i^3$, which is permitted to rise, so as to affect the dog of the clutch mechanism. The result is, that the dog engages the wheel $h^2$, so that motion is at once imparted to the entire binding mechanism. When the bundle is discharged, the descent of the trip-arm causes the arm $h^3$ to act upon and depress the dog $i^3$ to the position represented in Figs. 9 and 10. The revolution of the clutch causes the roller $j^3$ to ride beneath the dog $i^3$, which depresses the roller, and thereby disconnects the dog of the clutch, so that the binding devices are permitted to remain at rest until the gavel again releases the dog $i^3$ from the arm $h^3$.

I am aware that various devices actuated by a trip-arm have been employed to disconnect a binder-driving clutch; but the arrangement represented in the drawings is peculiarly advantageous, for the reason that it is practically noiseless in action, that it stops the devices always in the same position, and that it is practically free from wear.

For the purpose of adjusting the machine to produce automatically bundles of larger or smaller size, as may be demanded, I connect with the trip-arm $b^3$ a rod, $o^4$, encircled by a spiral spring, $p^4$, which is seated at one end against a fixed bearing, and at the other against a thumb-nut on the rod. This spring arrests the elevation of the trip-arm to start the binder, so that by turning the nut and increasing the tension of the spring the size of the bundles produced may be increased.

Referring, again, to the construction of the harvester-frame, it will be noted that the internal or secondary gear-frame, c, is sustained in part at its rear end by means of the main axle, upon or around which it is seated. In most cases it will be preferred to cast the gear-frame c in one piece with the arm b, the whole constituting in such case a single internal gear-frame. This construction is plainly represented by dotted lines in Fig. 3.

Referring, again, to the crank by which the binding-needle is vibrated, it will be perceived in Figs. 2 and 4 that the pitman and the chain-wheels overhang, or, in other words, fall within the line of the main harvester-frame. This construction, in connection with the beveled corner of the main frame and the seating of the binder-gear within the binder-standard, permits the binder-frame to be placed very near the main wheel, so that the grain may be delivered in rear of the wheel without giving the machine the excessive width which would otherwise be necessary.

On reference to the various figures it will be seen that the inner or main divider is extended rearward from the inner end of the cutter-bar between the main platform and the conveying mechanism, and at such height from the platform as to afford sufficient space for the passage of the grain thereunder. This extension of the divider and its arrangement to provide for passage of the grain beneath its rear end is highly advantageous in a machine of the present type, since it greatly facilitates the proper handling of the grain, and prevents the grain from falling into the packing and conveying mechanisms in an improper position. Its tendency is to cause the grain to fall upon the platform at right angles to the cutter-bar.

It will be observed that in my machine the gear-train of the harvester is located in advance of the axis of the main wheel, whereby its weight is applied to counterbalance that of the binding mechanism in rear of said wheel. This arrangement, in connection with the extension of the platform and cutting mechanism ahead of the wheel, secures a poise or balance of the entire machine upon the wheels, thus permitting the platform to be readily tipped or tilted forward and backward to change the height of the cut, and relieving the animals from excessive weight upon their necks.

I believe myself to be the first to construct a machine of the present type in which the weight is so adjusted as to secure this result.

I am aware that a combined ejector and compressor consisting of three arms fixed at an angle of one hundred and twenty degrees to each other has been combined with mechanism for imparting thereto intermittent movements of about one-third of a revolution each, and this I do not claim.

Having thus described my invention, what I claim is—

1. The main or platform conveyer, adapted, as described, to deliver the grain from the inner end of the platform in an oblique position, in combination with the secondary conveyers, the packers, and the binder-arm, all acting in a direction oblique to the cutter-bar.

2. The platform-conveyers, in combination with the butting-apron, the secondary conveyers, oblique to the finger-bar, the packers, also oblique to the finger-bar, the stationary abutment, against which the grain is delivered by the secondary conveyers, and the oblique binder-arm.

3. In a grain harvesting and binding machine, the combination of the platform-conveyers, to deliver the grain in an oblique position, and secondary conveyers acting in right lines oblique to the finger-bar to move the grain in a backward direction.

4. In a harvesting and binding machine, the main conveyer-chains arranged to cease their action at different distances from the inner end of the platform to deliver the grain in an oblique position, in combination with the oblique butting-apron acting to force the grain rearward in an endwise direction.

5. In a grain binding and harvesting machine, the combination of the platform-conveyer, the secondary oblique conveyer, and the stationary oblique abutment adapted to arrest and support the grain at both ends, whereby the grain is accumulated in a compact and straightened condition.

6. In a harvesting and binding machine, the abutment arranged obliquely in relation to the finger-bar at the rear stubble corner of the receiving-platform, and adapted to sustain the grain at both ends, in combination with the conveying mechanism, substantially such as shown, to deliver the grain in a continuing manner and with a turning motion from the platform against said abutment.

7. In a grain harvesting and binding machine, the wheel-frame having the rear corner oblique to the path of the wheel, and the platform-frame having the oblique extension adjacent thereto, in combination with the binder-frame secured at its base to the corner of the wheel-frame and extended toward the platform-frame, substantially as described and shown.

8. The combination of the binder frame or standard and the main-wheel frame of the harvester, having the oblique rear corner, with the base of the binder-frame bolted thereto.

9. The binder frame or standard having its base recessed, as described and shown, to receive the driving-gear.

10. In combination with the wheeled gear-frame A, substantially as described, the binder-standard bolted at its base directly thereto, with its overhanging arm extended rearward toward the grain side of the machine.

11. In combination with the dog $k^2$ of the binder-driving clutch, the dog $i^3$ and the finger $h^3$, connected with and actuated by the trip-arm in the grain-passage.

12. In a grain-binder, the bundle-ejecting and grain-retarding device, consisting, essentially, of the two arms fixed at an angle of one hundred and twenty degrees, or thereabout, to each other, in combination with operating mechanism, substantially as described, for imparting to said device complete continuous rotations with intervening periods of rest, whereby one arm is caused to discharge the bound bundles and the other arm caused to temporarily arrest the inflowing grain.

13. The binder-arm and the compressor-arm arranged to descend simultaneously on opposite sides of the gavel, in combination with the intermittingly-rotating shaft provided with the grain-arresting arm and the bundle-ejecting arm, as described, whereby the compressor is permitted to remain in an elevated position until it has passed clear of the discharged bundle.

14. In combination with the stripper and its operating-rod, the tyer-spindle and its pinion, and the driving-shaft provided with the gear-wheel to actuate the tyer, and with the cam-wheel to actuate the stripper.

15. In combination with the tyer-spindle and its rocking support, the cap or covering-plate constructed and secured to the rocking support, substantially as described and shown.

16. The tyer-spindle and its rocking support, in combination with the sliding yoke to open and close the tyer, and the cap or covering-plate adapted to guide the yoke.

17. In a cord-clamping device for a grain-binder, the clamping-wheel having a notched flange on its side face, in combination with the shoe or clamp, and an intermediate spring, $f'$, arranged, as described, to act against the cord and hold the same with a yielding pressure against the flange of the wheel.

18. In combination with the cord-clamping wheel having an annular notched flange on its side face, the stationary stripper-plate having its end seated in close proximity to the flange, as described and shown.

19. In combination with the main-wheel or gear-frame of a harvester and the axle mounted therein, the internal frame bolted to the main frame and extending over and resting upon the axle, as described and shown.

20. In combination with the main-wheel frame of the harvester, the binder-frame or gear-standard secured thereto, with the crank for driving the needle within the main-wheel frame, as described.

21. In combination with the butting-apron, its sustaining-rolls, and the swinging frame in which said rolls are mounted, a journal for said frame located in rear of the forward roll, a driving-pinion concentric with said journal, and gear mounted on the frame and communicating motion from said pinion to the journal of the forward roll.

22. A horizontally-swinging frame, a butting-apron and its sustaining-rolls therein, a vertical shaft or axis around which the frame swings, located between the two apron-sustaining rolls, and driving devices, substantially such as shown, connecting the shaft with one of said rolls.

23. In combination with the binder frame and wheel $h^2$, the shaft $n^2$, bearing at one end in the wheel and at the other end in the frame.

24. In combination with the reel and the butt-adjusting apron, the driving-shaft $d^4$, extending in the direction of the cutter, the beveled pinion secured to one end of said shaft, the intermediate gears connecting said pinion with the vertical roll of the butter-apron, the overlying reel-shaft provided with the sprocket-wheel, the sprocket-wheel $i^4$, secured to the shaft $d^4$, and the chain directly connecting said sprocket-wheels, as described and shown, whereby motion is communicated from the shaft $d^4$ directly to both the reel and the butting-apron.

25. In a low-level harvester and binder, the combination of the following elements: the platform-frame, the main-wheel frame, the main wheel attached thereto, with its axis in rear of the cutter-bar, the gearing for operating the harvesting and binding mechanism, located on the wheel-frame in advance of the wheel, and the binder-gear standard located on the wheel-frame, with its upright portion and the gear thereon in rear of the axis of the wheel, substantially as described and shown, whereby the weight of the binder is applied to counterbalance the weight of the driving mechanism, so that the weight is properly poised or balanced upon the wheel and the ready tilting of the machine permitted.

In testimony whereof I hereunto set my hand, this 11th day of December, 1884, in the presence of two attesting witnesses.

JAMES F. GORDON.

Witnesses:
 Z. L. DAVIS,
 GEO. B. SELDEN.